(12) United States Patent
Fujita et al.

(10) Patent No.: US 7,221,399 B2
(45) Date of Patent: May 22, 2007

(54) IMAGING APPARATUS WITH A MULTIFOCAL LENS FORMED OF TWO PIECES WITH DIFFERENT FOCAL LENGTHS

(75) Inventors: Tsutomu Fujita, Mobara (JP); Masatomo Kanegae, Hachiouji (JP)

(73) Assignee: Riverbell Inc., Hachiouji, Tokyo (JP)

( * ) Notice: Subject to any disclaimer, the term of this patent is extended or adjusted under 35 U.S.C. 154(b) by 698 days.

(21) Appl. No.: 10/398,272

(22) PCT Filed: Oct. 10, 2001

(86) PCT No.: PCT/JP01/08887

§ 371 (c)(1), (2), (4) Date: Apr. 2, 2003

(87) PCT Pub. No.: WO02/31770

PCT Pub. Date: Apr. 18, 2002

(65) Prior Publication Data

US 2003/0234867 A1  Dec. 25, 2003

(30) Foreign Application Priority Data

Oct. 12, 2000 (JP) ............................ 2000-348800

(51) Int. Cl.
- *H04N 5/225* (2006.01)
- *H04B 7/00* (2006.01)
- *H04B 3/10* (2006.01)
- *H04M 1/00* (2006.01)

(52) U.S. Cl. ................ 348/340; 348/342; 348/375; 348/376; 455/66.1; 455/556.1; 359/721

(58) Field of Classification Search ............... 348/235, 348/343, 340, 342, 375, 376; 359/721; 382/313, 382/314; 358/505, 473, 474; 235/462.32, 235/462.33, 462.49, 472.03; 455/66.1, 556.1
See application file for complete search history.

(56) References Cited

U.S. PATENT DOCUMENTS 4,878,120 A * 10/1989 Matsumoto et al. ......... 348/307
4,902,115 A *  2/1990 Takahashi .................... 359/362

(Continued)

FOREIGN PATENT DOCUMENTS

EP          0 536 481        4/1993

(Continued)

*Primary Examiner*—Ngoc-Yen Vu
*Assistant Examiner*—Nicholas G Giles
(74) *Attorney, Agent, or Firm*—Flynn, Thiel, Boutell & Tanis, P.C.

(57) ABSTRACT

An imaging apparatus for imaging a first object at a normal distance and a second object nearer than the first object readily with high precision. The imaging apparatus has an imaging lens, an imaging device for capturing an image formed by the imaging lens, and a camera control unit. The imaging lens is a multifocal lens and contains a first lens portion having a first focal length for imaging the first object (e.g., the user of the imaging apparatus) at a normal distance and a second lens portion having a second focal length for imaging the second object (e.g., a bar code) nearer than the first object. The first and second lens portions are arranged on the same plane and formed in one piece. The information collected by imaging the second object is used for processing such as communications or displays.

16 Claims, 8 Drawing Sheets

U.S. PATENT DOCUMENTS

| | | | | |
|---|---|---|---|---|
| 5,568,194 A | * | 10/1996 | Abe | 348/223.1 |
| 5,724,163 A | * | 3/1998 | David | 359/15 |
| 5,920,401 A | * | 7/1999 | Street et al. | 358/400 |
| 6,010,647 A | | 1/2000 | Nomura et al. | |
| 6,016,135 A | | 1/2000 | Biss et al. | |
| 6,032,862 A | * | 3/2000 | Watanabe et al. | 235/462.16 |
| 6,512,919 B2 | * | 1/2003 | Ogasawara | 455/422.1 |
| 6,700,613 B1 | * | 3/2004 | Bryant et al. | 348/342 |
| 6,724,934 B1 | * | 4/2004 | Lee et al. | 382/167 |
| 6,734,911 B1 | * | 5/2004 | Lyons | 348/340 |

FOREIGN PATENT DOCUMENTS

| | | |
|---|---|---|
| JP | 3-13535 | 2/1991 |
| JP | 5-83746 | 11/1993 |
| JP | 8-234693 | 9/1996 |
| JP | 8-320907 | 12/1996 |
| JP | 10-302019 | 11/1998 |
| JP | 11-23809 | 1/1999 |
| JP | 11-127382 | 5/1999 |
| JP | 11-239097 | 8/1999 |
| JP | 11-316413 | 11/1999 |
| JP | 2000-12820 | 1/2000 |
| JP | 2000-209146 | 7/2000 |
| JP | 2000-221007 | 8/2000 |
| JP | 2000-224328 | 8/2000 |
| JP | 2000-250698 | 9/2000 |
| JP | 2002-27047 | 1/2002 |
| JP | 2002-123825 | 4/2002 |
| WO | WO 99/60467 | 11/1999 |

* cited by examiner

IMAGING APPARATUS WITH A MULTIFOCAL LENS FORMED OF TWO PIECES WITH DIFFERENT FOCAL LENGTHS

BACKGROUND OF THE INVENTION

The present invention relates to an imaging apparatus having an image input function such as a personal digital assistant (PDA), a mobile telephone (including the Personal Handy-phone System (PHS)), a remote controller for consumer electronics such as a television or a videocassette recorder, a personal computer equipped with a camera, a monitoring camera, and so forth. For example, the imaging apparatus can be used for imaging a still image or a moving image of an object at a normal distance such as the user of the imaging apparatus or for reading a close up still image such as a digital code, characters, or the like with high precision. Then, the read image is displayed as it is, or the read image data is decoded to collect the information included in the digital code or the characters therein, so that the collected information can be displayed or used for various processes such as communication or the like.

Generally, an imaging apparatus having an image input function such as a charge coupled device (CCD) or the like has advantages, if it is capable of reading an approximate image of a bar code that is one kind of digital codes, while it can also read a desired image such as, for example, an image of the user himself/herself or the scenery. Because the bar code can represent various information such as, for example, a mail address, a homepage address, a telephone number, a facsimile (FAX) number, a company name, a belonging section, a job title, or the like, the use of such information in combination with the above-mentioned desired image can contribute to realize highly effective communications.

Conventionally, a specialized scanner has been used for reading a bar code. There are examples of reading bar codes by using image input devices such as personal computers or the like. In such cases, an image input lens for imaging an object at a normal distance such as the user or the scenery ranging from a short distance (e.g., approximately 0.3 m) to a long distance has been used for reading a bar code.

However, using the above mentioned specialized scanner is highly complicated in operation and handling, and thus it is not practical. In addition, when the lens for imaging an object at a normal distance is used to read a bar code as described above, it is difficult to read a complicated image due to an insufficient resolution, especially a two-dimensional bar code or the like, to decode and recognize the information included in the image.

As a solution for this problem, it is conceivable to prepare one normal lens for imaging an object at a normal distance (e.g., the user) and one close-up lens for imaging an object nearer than the object at a normal distance (e.g., a bar code), and to select or switch the proper imaging lens for use by revolving a platter on which the imaging lenses are attached or by sliding these imaging lenses. However, such operation is complicated and impractical, and moreover, such constructions hinder a miniaturization of the imaging apparatus.

Accordingly, it is desirable that an imaging apparatus has an image input function to image not only an object at a normal distance such as the user, scenery, or the like, but also an object such as a bar code nearer than the object at a normal distance readily with high precision.

Therefore, an object of the present invention is to provide an imaging apparatus which is capable of imaging a first object at a normal distance and a second object nearer than the first object readily with high precision.

SUMMARY OF THE INVENTION

The present invention provides an imaging apparatus having an imaging lens, an imaging device for capturing an image formed by the imaging lens, and a camera control unit, wherein the imaging lens is a multifocal lens composed of a first lens portion having a first focal length for imaging a first object at a normal distance and a second lens portion having a second focal length for imaging a second object nearer than the first object, and the first and second lens portions are arranged on the same plane and formed in one piece.

Here, the "normal distance" means a distance from a minimum depth of focus (e.g., 0.3 m) of the first lens portion to infinity. The "second object nearer than the first object" means that the second object is relatively nearer to the imaging lens than the first object.

To be "formed in one piece" means that the first lens portion and the second lens portion may be formed as separate members and thereafter formed in one piece, or that the first lens portion and the second lens portion may be processed and formed using one member. In case that the lenses are formed as separate members, they can either be the same materials or the different materials.

The "first object" means specifically, for example, a face or a body of the user, scenery at a far distance, or the like, and the "second object" means specifically a digital code such as a bar code, characters or the like.

As for the "imaging device," a complementary metal-oxide semiconductor (CMOS), a charge coupled device (CCD), or the like can be used.

When an image memory for storing images captured by the imaging device is provided, specifically, a random access memory (RAM), an electrically erasable and programmable ROM (EEPROM), or the like can be used as the image memory.

According to the present invention, a first object at a normal distance from a minimum depth of focus (e.g., 0.3 m) to infinity is imaged by the first lens portion and captured in the imaging device, and a second object placed nearer than the first object is imaged by the second lens portion and captured in the imaging device.

Consequently, a much higher resolution than the conventional art can be achieved because the second object is imaged by the second lens portion having a second focal length which is different from a first focal length of the first lens portion.

The first and second lens portions are arranged on the same plane and formed in one piece to compose one imaging lens. Different from a case that two imaging lenses are used for respectively imaging a first and a second objects, it is not necessary to perform a complicated operation such as selecting or switching the imaging lens to use by revolving a platter on which the imaging lenses are attached or by sliding both the imaging lenses, so that an imaging can be performed readily and quickly. Furthermore, the imaging apparatus can be reduced in weight and be miniaturized, thereby making it advantageous for portability.

A switching of the first lens portion and the second lens portion can be performed readily and quickly by dividing a screen of the imaging device, thereby making it highly advantageous for practical use. Further, the switching of the lens portions is practically possible even with the same screen of the imaging device by switching the object to image between a first object and a second object, thus accomplishing the above-mentioned purposes.

In the above-mentioned imaging apparatus of the present invention, preferably, the same plane should be orthogonal to an optical axis of the imaging lens.

Furthermore, in the above described imaging apparatus of the present invention, it is preferable that a front shape of the first lens portion is one of a circular shape, an oval shape, or a polygonal shape, and a front shape of the second lens portion is a ring shape. Then the second lens portion is preferred to be arranged outside the first lens portion in concentric with the first lens portion.

Here, the "front shape" means a shape of the imaging lens viewed from a direction along an optical axis of the imaging lens. For the lens portion arranged inside, the front shape means a shape of an outer periphery outline (outer edge shape) viewed from a direction along an optical axis of the imaging lens. For the lens portion arranged outside, the front shape means a shape of an outer periphery outline (outer edge shape) and a shape of an inner periphery outline (inner edge shape) viewed from a direction along an optical axis of the imaging lens.

The "polygonal shape" is preferred to be line symmetry or point symmetry. Further, it is not necessary to be a regular polygon. The corners of the "polygonal shape" can be rounded or chamfered.

To be "arranged outside the first lens portion" means that the second lens portion may be arranged in direct contact with the outer edge of the first lens portion, or that the second lens portion may be arranged outside the outer edge of the first lens portion, for example, with a ring shape member intervened therebetween. However, the arrangement in direct contact with the outer edge of the first lens portion is preferable regarding simplification and stabilization of structure and facilitation of manufacture.

To be "arranged in concentric" means that the first lens portion and the second lens portion are arranged in such a manner that the optical axis of the first lens portion coincides with the optical axis of the second lens portion.

The first and second lens portions being formed to have those above-mentioned front shapes contribute to a simplification of structure, a facilitation of manufacture, a simplification of obtaining a high quality image, and an improvement of decoding precision. Especially, a highly desirable result can be obtained by a concentric composition in which the front shape of the first lens portion is a circular shape, and the front shape of the second lens portion is a ring shape.

The above-mentioned arrangement of the first and the second lens portions may be reversed, and the identical effect can still be obtained in this case. In other words, in the above-mentioned imaging apparatus of the present invention, the front shape of the first lens portion may be a ring shape, and the front shape of the second lens portion may be one of a circular shape, an oval shape, or a polygonal shape. Then, the first lens portion may be arranged outside the second lens portion in concentric with the second lens portion. Especially, a highly desirable result can be obtained by a concentric composition in which the front shape of the first lens portion is a ring shape, and the front shape of the second lens portion is a circular shape.

In either case, the first or the second lens portion is the lens portion arranged outside, and its front shape may have an outer edge shape and an inner edge shape that are different to each other. For example, the outer edge shape may be a polygonal shape while the inner edge shape is a circular shape. In other words, the outer edge shape of the lens portion arranged outside may be different from the outer edge shape of the lens portion arranged inside.

Further, the inner edge shape of the lens portion arranged outside may be different from the outer edge shape of the lens portion arranged inside. In other words, there may be formed a gap between the inner edge of the lens portion arranged outside and the outer edge of the lens portion arranged inside.

Furthermore, in the above described imaging apparatus of the present invention, the front shape of the first lens portion may be one of a portion of a circular shape, a portion of an oval shape, or a portion of a polygonal shape, and the front shape of the second lens portion may be one of the other portion of a circular shape, the other portion of an oval shape, or the other portion of a polygonal shape. Then, the first and second lens portions may be arranged in such a manner that a linear portion formed on the outline of the first lens portion is arranged in direct contact with a linear portion formed on the outline of the second lens portion.

Here, the meanings of the "front shape" and the "polygonal shape" have already been explained above.

The "a portion of a circular shape" and the "other portion of a circular shape" are one and the other portions divided from one circular shape being cut in straight line. The straight line to cut the circular shape is not necessarily being a diameter line on the center of the circular shape.

The "a portion of an oval shape" and the "other portion of an oval shape" are one and the other portions divided from one oval shape being cut in straight line. The straight line to cut the oval shape is not necessarily being a long axis line or a short axis line on the center of the oval shape.

The "a portion of a polygonal shape" and the "other portion of a polygonal shape" are one and the other portions divided from one polygonal shape being cut in straight line. The straight line to cut the polygonal shape is not necessarily being a center line of symmetry when the polygonal shape is line symmetry, and the straight line is not necessary being on a center point of symmetry when the polygonal shape is point symmetry.

When adopting this composition, the first lens portion may either be arranged or not arranged in concentric with the second lens portion. In other words, the optical axis of the first lens portion may either coincide or not coincide with the optical axis of the second lens portion.

One example of a manufacturing method of the multifocal imaging lens described above will be explained with references to FIG. 16 through FIG. 18. In addition, FIG. 16, FIG. 17 and FIG. 18 are explanatory views, and the first and second lens portions of the present invention are not restricted to the shapes shown in these views.

As shown in FIG. 16, a long focal length lens 465 and a short focal length lens 466 are prepared. A center portion 465*a* of the long focal length lens 465 and a peripheral portion 466*b* of the short focal length lens 466 are combined as shown in FIG. 17. Accordingly, an imaging lens 422 with the center portion 465*a* having a circular front shape of the long focal length lens 465 as a first lens portion 461 and the peripheral portion 466*b* having a ringed front shape of the short focal length lens 466 as a second lens portion 462 is obtained.

In addition, the relation of the lenses 465 and 466 may be reversed to compose a multifocal imaging lens with a periphery portion having a ringed front shape of the long focal length lens 465 as the first lens portion, and a center portion having a circular front shape of the short focal length lens 466 as the second lens portion.

Further, since an imaging lens used in the present invention is satisfactory as long as it is composed of a first and a second lens portions with different focal lengths to each other, the imaging lens may be formed, for example, not only by separately forming two glass lenses with different focal lengths to each other and thereafter composing them to one piece as described above, but also by processing plastic such as an acrylic resin or the like to form the first and the second lens portions in one piece at the same time.

In the former case, the border line of the first lens portion and the second lens portion will be a distinct line. In the latter case, the border line of the first lens portion and the second lens portion will be smooth without any distinct line, but it does not hinder the practical use.

On the other hand, the front shape of the first lens portion may be one of a portion of a circular shape, a portion of an oval shape, or a portion of a polygonal shape, and the front shape of the second lens portion is one of the other portion of a circular shape, the other portion of an oval shape, or the other portion of a polygonal shape. A linear portion formed on the outline of the first lens portion is arranged in direct contact with a linear portion formed on the outline of the second lens portion as described above. In this case, two glass lenses with different focal lengths to each other may be separately formed and thereafter composed of one piece, or plastic may be processed to form both the lens portions in one piece at the same time. When plastic is processed just like the latter case, the border line of the first lens portion and the second lens portion will be smooth without any distinct line, but it does not hinder the practical use.

For the imaging apparatus of the present invention, glass or plastic is the preferable material to form the imaging lens.

Furthermore, the imaging apparatus of the present invention may be structured to have an image memory for storing images captured by the imaging device, in which a first image obtained by imaging a first object is formed at a first image-forming section of the imaging device and then stored in the image memory as a first image signal, and a second image obtained by imaging a second object is formed at a second image-forming section, that is a different region from the first image-forming section, of the imaging device and then stored in the image memory as a second image signal.

In this manner, the first and the second image-forming sections are formed in different regions of the imaging device so that a switching of the first and second lens portions can be performed readily and quickly by dividing a screen of the imaging device, thereby making it highly advantageous for practical use.

Accordingly, it is desirable that the imaging apparatus of the present invention is structured to have an image memory which stores a first image obtained by imaging a first object as a moving image or a still image, and a second image obtained by imaging a second object as a moving image or a still image. In this structure, a first image such as a moving image of the user or the like and a second image such as a still image of a bar code or the like can be stored in the image memory.

In the above described imaging apparatus of the present invention, a second object is a digital code or characters, and it is desired to have a decoding means for decoding a digital code or characters and a communicating means for performing communications based on the information included in a digital code or characters which are decoded by the decoding means.

The "digital code" includes, for example, a one-dimensional or two-dimensional bar code or the like. The "communicating means" may be, for example, a wireless transmitting/receiving mechanism provided in a mobile telephone (including the PHS) or the like, or it may also be, for example, a communicating means through a wired network such as the internet, a LAN, or the like.

When the imaging apparatus is structured to have the decoding means and the communicating means, it can communicate based on the information included in a decoded digital code or characters to perform various processes such as making a telephone call to the decoded phone number, downloading a homepage to display from the decoded homepage address, or the like.

In the imaging apparatus structured to have the decoding means and the communicating means as described above, it is also desirable to have a notifying means for notifying a completion of the decoding process of the decoding means. As for the notifying means, for example, a speaker for producing a voice or a confirmation sound upon a completion of the decoding process of the decoding means, a light-emitting mechanism for emitting a light upon a completion of the decoding process of the decoding means or the like can be preferably used.

When the notifying means is provided, the user of the imaging apparatus can be easily notified of the completion of the decoding process.

When the imaging apparatus is structured to have the decoding means and the communicating means as described above, it may further include a displaying means for displaying a completion of the decoding process of the decoding means. When the displaying means is provided, the user of the imaging apparatus can confirm the completion of the decoding process on a screen of the displaying means.

Further, when the imaging apparatus is structured to have the decoding means and the communicating means as described above, it is desirable to have a displaying means for displaying at least one of either the decoded result of the decoding means or the communication result of the communicating means. When the display means for displaying a decoded result or a communication result is provided, the user of the imaging apparatus can obtain various information by referring to the displaying means so that the function of the imaging apparatus can be improved.

Further, in the imaging apparatus of the present invention as described above, an optical shutter to switch the first and the second lens portions may be arranged between the imaging lens and the imaging device. As for the "optical shutter," for example, a shutter using the liquid crystal or the like is excellent in practical use. When the optical shutter is arranged in this manner, an image with high contrast between light and shade can be formed.

In the above described imaging apparatus of the present invention, it is desirable to have a light-emitting means for producing a flashlight synchronously with scan timing of the imaging device when imaging a second object. As for the "flashlight," not only a flashlight produced by a regular photographic flashlight, but also a flashlight produced by an infrared flash, an ultraviolet flash or the like can be used.

When the light-emitting means is provided, the imaging apparatus can produce a flashlight synchronously with scan timing of the imaging device when imaging a second object that is normally in close proximity, so that a shade of the user or the like can be effectively prevented from occurring, and thus a clear image can be obtained, thereby making it advantageous for imaging a second object.

In the above described imaging apparatus of the present invention, it is desirable to have a detecting means for detecting a saturation current from the imaging device and a driving means for driving a drive circuit of the imaging device according to a signal from the detecting means. When adopting this structure, the saturation electron from the imaging device can be used to detect an appropriate storage time. Accordingly, the storage time of the light can be lengthened to improve sensitivity.

Further, in the above described imaging apparatus of the present invention, it is desirable to have a color filter, which is used when imaging a second object, arranged on at least one side of a front or a back face of the imaging lens. Here, the "color filter" is a light filter that is pervious to the light with a specific wavelength and is impervious to the light with the other wavelengths.

When the color filter is provided, it is possible to let the light with a specific wavelength emitted from a second object penetrate the imaging lens while light with the other wavelengths is blocked, so that a second object can be imaged with high contrast. For example, when a second object is a bar code or the like printed in invisible ink, the light with a wavelength of the invisible ink, which is emitted upon irradiation of excitation light to the bar code, penetrates the color filter while the light with the other wavelength is blocked, so that the image from the invisible ink can be clearly imaged.

Furthermore, the above described imaging apparatus of the present invention, it is desirable to have an image memory for storing an image of a second object captured by the imaging device, the image memory plurally divided for each color, and a compensating means for compensating a signal stored in one of the divided image memories for respective colors according to a signal stored in one of the other image memories for respective colors.

Here, the "image memories divided for respective colors" are, for example, image memories respectively divided for the three colors of an image signal such as a red image memory, a green image memory, a blue image memory or the like.

When the compensating means is provided, a signal stored in one of the image memories for respective colors can be compensated according to a signal stored in one of the other image memories in relation to an image obtained by imaging a second object, that is, an advantage for improving the contrast of an image to obtain a clear image of the second object. Consequently, when the second object is a bar code or the like, it is possible to precisely read the information included in this bar code.

Furthermore, in the above described imaging apparatus of the present invention, it is desirable to have a difference operation processing means for producing an image of a second object based on a difference between an image signal obtained by imaging with irradiation of excitation light on the second object and an image signal obtained by imaging without irradiation of excitation light. Here, as for the "excitation light," light with a shorter wavelength (e.g. an ultraviolet ray) than light emitted from the fluorescent material is used. When the fluorescent material emits infrared region light, infrared light that is close to visible light can be used.

When the difference operation processing means is provided, an imaging of a second object that emits fluorescent light is performed with irradiation of exciting light to excite fluorescent light, and then an image of the second object is obtained from a difference between the image signal obtained by the irradiation of exciting light and the image signal obtained without the irradiation of exciting light. Accordingly, it is highly advantageous for detecting a bar code formed by such kind of ink that emits light under irradiation of exciting light.

Furthermore, in the above-mentioned imaging apparatus, it is desirable to have a displaying means for displaying information on a screen and an illuminating means attached to the displaying means for illuminating a second object by illumination from the screen of the displaying means when imaging the second object. Here, as for the "displaying means," for example, a liquid crystal display device or the like can be preferably used.

When the illuminating means for illuminating a second object by illumination from the screen of the displaying means is provided, the reading of the second object is performed while it is illuminated by the illuminating means in order to obtain a clear image of the second object, thereby improving the decoding precision.

Furthermore, in the above-mentioned imaging apparatus, it is desirable to include an antenna for wireless transmitting and receiving. The antenna in a storage status is preferred to have a length that optimizes a distance between a second object arranged on the surface which the top of the antenna comes in contact with and the second lens portion. The length of antenna defined in this manner enables an easy, quick, and precise optimization of the distance between the second lens portion and the second object when imaging the second object to thereby obtain a high quality image.

DETAILED DESCRIPTION

To describe the present invention in detail, the present invention will be explained with reference to the drawings.

First Embodiment

Figure 1:
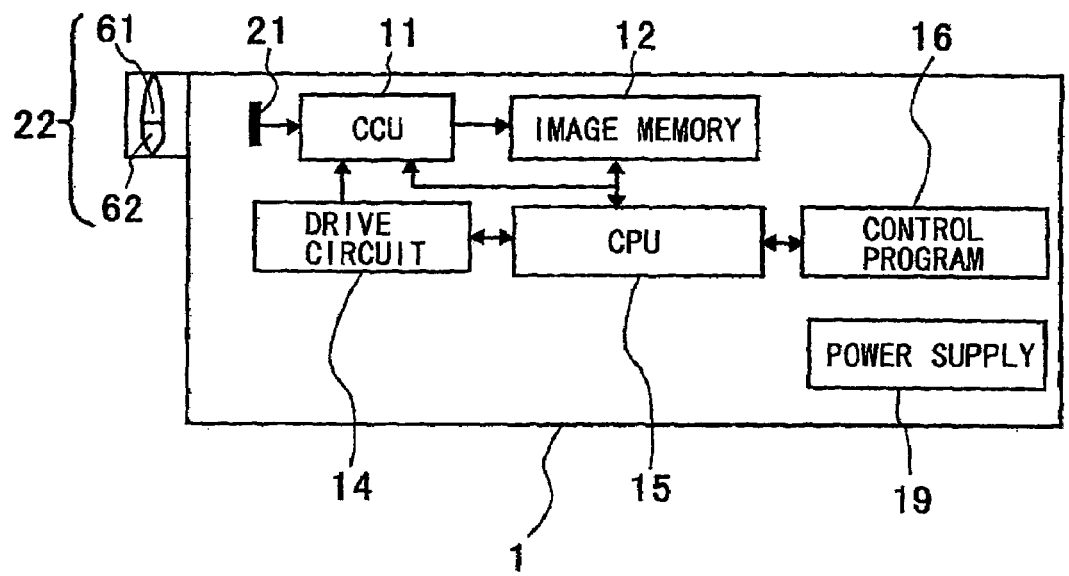
FIG. 1 is an overall structure view showing an imaging apparatus of a first embodiment of the present invention.
Figure 2:
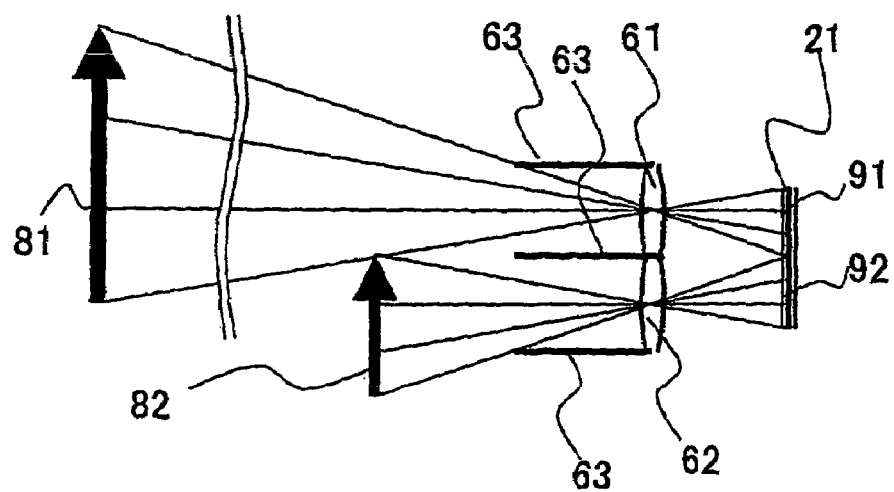
FIG. 2 is an explanatory view showing an effect of the imaging lens of the imaging apparatus of the first embodiment.

FIG. 1 is an overall structure view showing the imaging apparatus 1 of the first embodiment of the present invention. FIG. 2 is an explanatory view showing an effect of the imaging lens 22 of the imaging apparatus 1.

In FIG. 1, the imaging apparatus 1 includes an imaging lens 22 for imaging the first and the second objects 81 and 82 (refer to FIG. 2), an imaging device 21 for capturing an image formed by the imaging lens 22, a camera control unit (hereinafter, abbreviated to "CCU") 11 for controlling image qualities of image signals of the first and the second objects 81 and 82 abstracted from the imaging device 21, and an image memory 12 for storing the image signals processed by the CCU 11 as moving images or still images.

The imaging apparatus 1 also includes a drive circuit 14 for driving the imaging device 21, a central processing unit (hereinafter, abbreviated to "CPU") 15 for performing an operation process on the image signals of the second object 82 stored in the image memory 12, a control program 16 that prescribes an operating procedure for the CPU 15, and a power supply 19 for supplying necessary power to each circuit.

As for the imaging device 21, a complementary metal-oxide semiconductor (CMOS), a charge coupled device (CCD), or the like can be used.

The imaging lens 22 is composed of a first lens portion 61 made of glass for example, and a second lens portion 62 made of glass for example. The first and the second lens portions 61 and 62 are arranged on the same plane and formed in one piece, and thus the imaging lens 22 is formed as a multifocal lens. The plane on which the first and the second lens portions 61 and 62 are arranged is orthogonal to an optical axis of the imaging lens 22. In this first embodiment, a border line between the first lens portion 61 and the second lens portion 62 is a straight line for example, and a lower edge portion of the first lens portion 61 having a front shape in semicircular shape for example and an upper edge portion of the second lens portion 62 having a front shape in semicircular shape for example are arranged in contact with each other.

The CPU 15 and the control program 16 compose a decoding means for decoding an image data of the second object 82 such as a bar code for example, which is one kind of digital codes, in order to recognize the information included in the image data of the second object 82.

Further, the imaging apparatus 1 includes a detecting means not shown in the view for detecting a saturation current from the imaging device 21, and a driving means not shown in the view for driving the drive circuit 14 of the imaging device 21 according to a signal from the detecting means.

In the first embodiment, the imaging apparatus 1 performs an imaging of the first and the second objects 81 and 82 as follows.

In FIG. 2, the focal length of the first lens portion 61 is, for example, 5 mm. By this first lens portion 61, the first object 81 at a normal distance such as an object in the vicinity (e.g., a face of a user of a mobile telephone at a distance of 0.3 m), the scenery at a far distance, or the like is formed in image in the first region of the imaging device 21 as a first image 91. The region in which the image 91 is formed corresponds to a first image-forming section of the present invention. On the other hand, a focal length of the second lens portion 62 is, for example, 4.3 mm. By this second lens portion 62, the second object 82 such as a bar code for example, which is one kind of digital codes or the like, nearer than the first object 81 is formed in image in the second region of the imaging device 21 as a second image 92. The region in which the image 92 is formed corresponds to a second image-forming section of the present invention.

First, the first object 81 is imaged using the first lens portion 61, and then the imaging device 21 is driven by the drive circuit 14, so that an image signal of the first image 91 is abstracted from the imaging device 21. Thereafter, the obtained image signal of the first object 81 is processed in CCU 11 and then stored in the image memory 12 as a moving image or a still image. In this first embodiment, the distance between a principal plane of the first lens portion 61 and the imaging device 21 is defined to be 5 mm to 5.1 mm for example.

Further, as shown in FIG. 2, shields 63 are placed in the vicinities of the first and the second lens portions 61 and 62 of the imaging lens 22 in order to prevent light passing through the second lens portion 62 from reaching the image-forming section of the first image 91 in the imaging device 21.

Next, a two-dimensional bar code at a distance of approximately 30 mm for example is imaged as the second object 82. At this time, the second object 82 is imaged using the second lens portion 62, and then the imaging device 21 is driven by the drive circuit 14 to abstract an image signal of the second image 92. Thereafter, the obtained image signal is stored in the image memory 12 as a still image. Since the light shields 63 are placed in the vicinities of the first and the second lens portions 61 and 62 as described above, the light passing through the first lens portion 61 is similarly prevented from reaching the image-forming section of the second image 92. Subsequently, the image signal of the second object 82 stored in the image memory 12 as a still image is subjected to the operation processing by the CPU 15 using the control program 16. In addition, the necessary power for each of the above circuits is provided by the power supply 19.

According to the first embodiment, the following effects are presented. Since the imaging lens 22 is composed of the first and the second lens portions 61 and 62 with different focal lengths to each other, the first object 81 at a normal distance from a minimum depth of focus (e.g., 0.3 m) to infinity can be imaged by the first lens portion 61 and stored in the image memory 12 as a moving image or a still image, and a second object 82 (e.g., a bar code) placed nearer than the first object 81 can be imaged by the second lens portion 62 and stored in the image memory 12 as a still image.

Consequently, much higher resolution than the conventional art can be obtained.

In addition, the first and the second lens portions 61 and 62 are arranged on the same plane, and these lens portions 61 and 62 are formed in one piece to compose the imaging lens 22, so that it is not necessary to perform a complicated operation such as revolving or sliding to switch or replace lenses. Accordingly, an imaging can be performed simply.

Furthermore, because the detecting means and the driving means not shown in the view are provided, it is capable of detecting an appropriate storage time by utilizing a saturation current which the imaging device 21 outputs. Accordingly, the storage time can be lengthened to improve sensitivity.

In addition, an optical shutter to switch the first lens portion 61 and the second lens portion 62 may be arranged between the imaging lens 22 and the imaging device 21. Consequently, an image can be formed in much higher contrast between light and shade.

Second Embodiment

Figure 3:
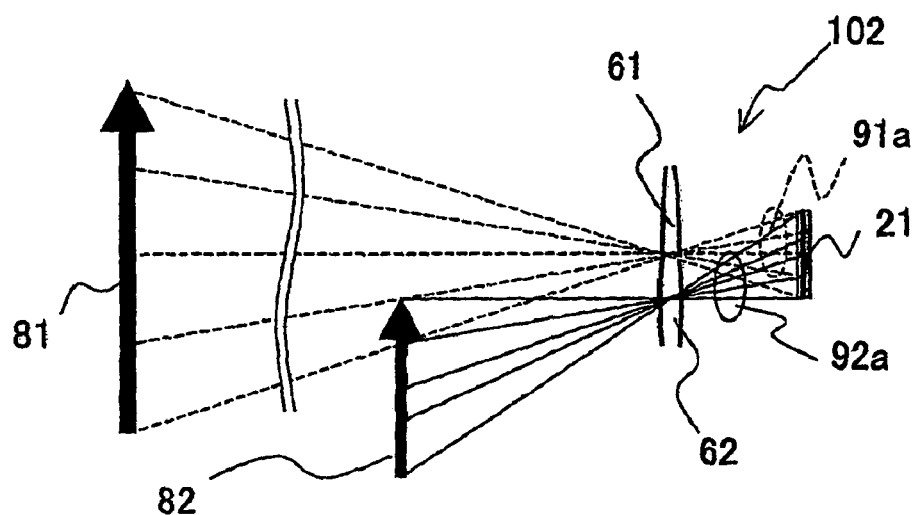
FIG. 3 is an explanatory view showing an effect of the imaging lens provided in the imaging apparatus of the second embodiment of the present invention.

FIG. 3 is an explanatory view showing an effect of the imaging lens provided in the imaging apparatus 102 of the second embodiment of the present invention.

In FIG. 3, the imaging apparatus 102 has a structure excluding the shields 63 (refer to FIG. 2) which are respectively placed in the vicinities of the first and the second lens portions 61 and 62 in the imaging apparatus 1 of the aforementioned first embodiment. Since the rest of the structure is the same as that of the imaging apparatus 1 of the aforementioned first embodiment, the same reference numerals are designated to the same components to omit explanations in detail, and only the different components will be explained below.

As shown in FIG. 3, when the shields 63 are removed, light 91a (dashed line in the view) that passes through the first lens portion 61 is incident on the whole plane of the imaging device 21. Similarly, light 92a (solid line in the view) that passes through the second lens portion 62 is incident on the whole plane of the imaging device 21. Consequently, when imaging the first object 81, light passed through the second lens portion 62 incidents on the imaging device 21 as light not formed in image, which lowers the contrast. However, the contrast is compensated by the CCU 11 to obtain a substantially normal image. Similarly, when imaging the second object 82, light passed through the first lens portion 61 incidents on the imaging device 21 as light not formed in image, which lowers the contrast. However, the contrast is compensated by the CCU 11 to obtain a substantially normal image.

Therefore, the imaging apparatus 102 in this second embodiment excluding the shields 63 can present the identical effects to those of the imaging apparatus 1 of the first embodiment.

Third Embodiment

Figure 4:
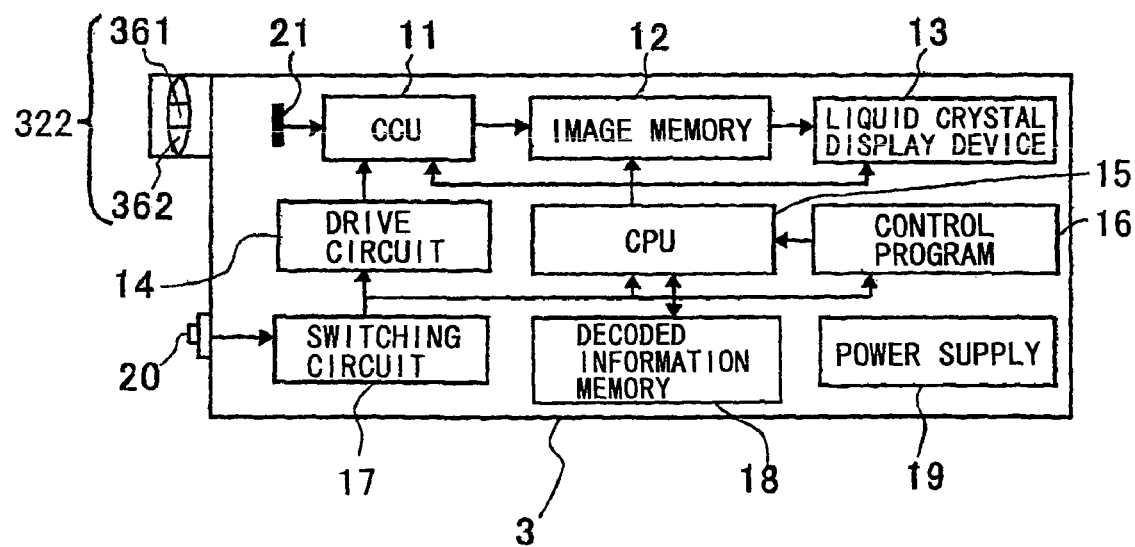
FIG. 4 is an overall structure view showing the imaging apparatus of the third embodiment of the present invention.
Figure 5:
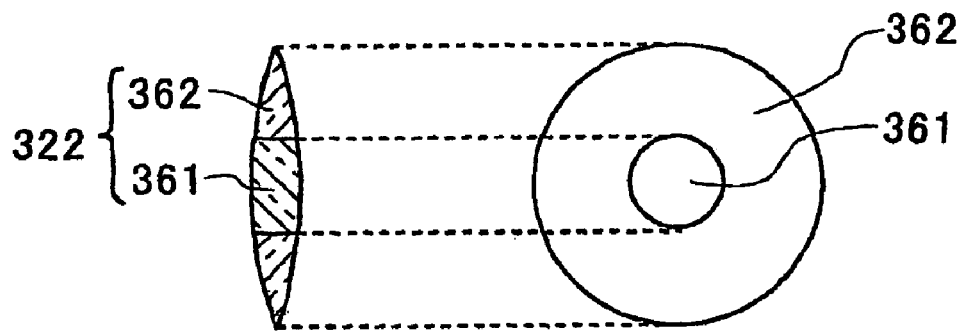
FIG. 5 is an enlarged view showing the imaging lens of the imaging apparatus of the third embodiment.
Figure 6:
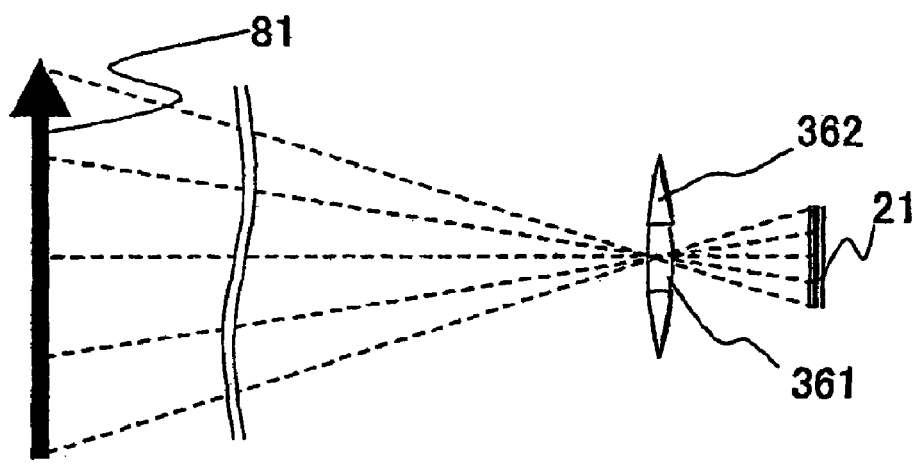
FIG. 6 is an explanatory view showing an effect of the imaging lens of the imaging apparatus of the third embodiment.

FIG. 4 is an overall structure view showing the imaging apparatus 3 of the third embodiment of the present invention, and FIG. 5 is an enlarged view showing the imaging lens 322 of the imaging apparatus 3. The FIG. 6 and FIG. 7 are explanatory views showing effects of the imaging lens 322 of the imaging apparatus 3.

Figure 7:
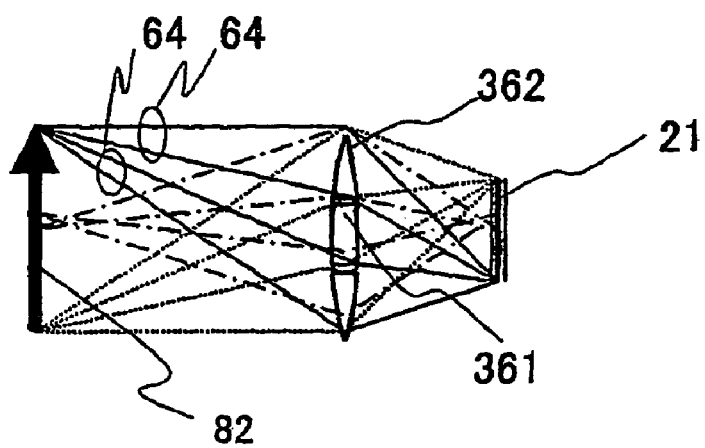
FIG. 7 is an explanatory view showing another effect of the imaging lens of the imaging apparatus of the third embodiment.

In FIG. 4, the imaging apparatus 3 has the structure of the imaging apparatus 1 (refer to FIG. 1) of the aforementioned first embodiment, to which are added a liquid crystal display device 13 as a displaying means for displaying various information on a screen, a not-shown optical shutter arranged between the imaging lens 322 and the imaging device 21, a switching circuit 17 for switching and selecting a first lens portion 361 and a second lens portion 362 by the optical shutter, a switch 20 for operating the switching circuit 17, and a decoded information memory 18 for storing information obtained by decoding an image data of the second object 82 (refer to FIG. 7). Furthermore, the imaging apparatus 3 includes the imaging lens 322 having a different composition from the imaging lens 22 of the aforementioned first embodiment. Since the rest of the structure is the same as that of the imaging apparatus 1 of the aforementioned first embodiment, the same reference numerals are designated to the same components to omit explanations in detail, and only the different components will be explained below.

In FIG. 5, the imaging lens 322 is composed of a first lens portion 361 made of glass for example, and a second lens portion 362 made of glass for example. The first lens portion 361 has a front shape in circular shape for example and is arranged at the center. On the other hand, the second lens portion 362 has a front shape in ring shape (doughnut shape) for example and is arranged outside the first lens portion 361 in contact with the outer edge portion of the first lens portion 361. These first and second lens portions 361 and 362 are arranged and formed in one piece in such a manner that their optical axes coincide with each other, and in other words both the lens portions are arranged in concentric with each other. In this manner, the imaging lens 322 is formed as a concentric multifocal lens. In addition, the plane on which these first and second lens portions 361 and 362 are arranged is orthogonal to the optical axis of the imaging lens 322.

As the optical shutter, a liquid crystal shutter or the like is preferable in practical use. On this liquid crystal shutter, front and rear transparent electrodes are respectively arranged on opposing faces of front and rear transparent plates, and a liquid crystal substance layer is arranged and sealed therebetween. The liquid crystal shutter blocks light when voltage is applied to the above-mentioned liquid crystal substance layer, but the liquid crystal shutter let through light when voltage is not applied to the liquid crystal substance layer. Accordingly, each light that passes through the first lens portion 361 or the second lens portion 362 can be individually passed or blocked.

In the third embodiment, the imaging apparatus 3 performs an imaging of the first and the second objects 81 and 82 as follows.

When imaging the first object 81, the optical shutter of the second lens portion 362 is shut, and the imaging is performed only by the first lens portion 361 as shown in FIG. 6. When imaging the second object 82 (e.g., two-dimensional bar code), the optical shutter of the first lens portion 361 is shut, and the imaging is performed only by the second lens portion 362 as shown in FIG. 7. In this case, although the second lens portion 362 is ring shape, the light 64 from the object is concentrated at one point on focusing surface of the imaging device 21, so that an image in high contrast can be obtained.

When respectively imaging the first and the second objects 81 and 82 using the first and the second lens portions 361 and 362 of the imaging lens 322 as described above, the switching of the first and the second lens portions 361 and 362 is performed by pressing the switch 20 that operates the switching circuit 17.

Thereafter, similarly to the aforementioned first embodiment, an image data of the first object 81 which is imaged by the first lens portion 361 is stored in the image memory 12 as a moving image or a still image. An image data of the second object 82 imaged by the second lens portion 362 is stored in the image memory 12 as a still image, and thereafter, this image data is subject to the operation process by the CPU 15 using the control program 16 to thereby display the image stored in the image memory 12 (e.g., an image or characters as it is of a two-dimensional bar code) as a still image as it is on the liquid crystal display device 13.

Furthermore, information included in an image data (e.g., information related to a two-dimensional bar code that is, namely, information having any particular meaning included in a two-dimensional bar code) of the second object 82, which is decoded by the decoding means composed of the control program 16 and the CPU 15, is stored in the decoded information memory 18, and this stored information is either displayed on the liquid crystal display device 13 or used for operating the CPU 15 to send and receive (transmitting and receiving) information. At this time, sending and receiving information is conducted with other devices or recording mediums which are connected to the imaging apparatus 3 through a network such as the internet or a local area network (LAN), or simply through an indoor cable or the like. In addition, other information obtained by sending and receiving information may further be displayed on the liquid crystal display device 13.

According to the third embodiment, the following effects are presented. Similar to the imaging lens 22 of the aforementioned first embodiment, since the imaging lens 322 is composed of the first and the second lens portions 361 and 362 with different focal lengths to each other, a first object 81 can be imaged using the first lens portion 361, and a second object 82 can be imaged using the second lens portion 362. Consequently, much higher resolution than the conventional art can be obtained.

In addition, similar to the aforementioned first embodiment, the first and the second lens portions 361 and 362 are arranged on the same plane, and these lens portions 361 and 362 are formed in one piece to compose the imaging lens 322, so that it is not necessary to perform a complicated operation such as revolving or sliding to switch or replace lenses. Accordingly, an imaging can be performed simply.

Furthermore, since the liquid crystal display device 13 is included, various information obtained from an image data of the second object 82 can be displayed. For example, when a two-dimensional bar code is imaged as the second object 82, the image of the two-dimensional bar code as it is can be displayed as a still image on the liquid crystal display device 13. Further, just by imaging a two-dimensional bar code, a telephone number, an internet homepage address or the like denoted by the two-dimensional bar code can be recognized, and such recognized information can be displayed on the liquid crystal display device 13. Furthermore, by sending and receiving information with other devices like recoding mediums, a facial image of a calling party of the recognized telephone number, or a homepage screen corresponding to the recognized internet homepage address can be displayed on the liquid crystal display device 13.

In this third embodiment, the optical shutter is included, but it is possible to omit the placement of this optical shutter. Even when the placement of the optical shutter is omitted, an iris of the lens will still be stopped down when imaging the first object 81 since the first object 81 is normally bright, so that a main imaging is performed by the first lens portion 361 arranged at the center to thereby obtain a correctly focused first image. On the other hand, when imaging the second object 82, an image signal with sufficiently high contrast can be obtained by the second lens portion 362 in ring shape arranged at the peripheral portion, but an image of the first lens portion 361 is largely defocused, which lowers the contrast of the image from the second lens portion 362. However, since the second object 82 is a binary signal with a clear contrast between light and shade such as a bar code for example, the lowered contrast can readily be improved by signal processing, and thus it poses no problem in practical use. Furthermore, when the optical shutter is arranged between the imaging lens 322 and the imaging device 21 as described in this third embodiment, an image with much higher contrast between light and shade can be formed.

In addition, in this third embodiment, the first lens portion 361 is formed in a circular shape and arranged at the center, and the second lens portion is formed in a ring shape and arranged outside the first lens portion. However, the arrangement of both lens portions may be reversed so that the second lens portion formed in a circular shape and arranged inside, and the first lens portion formed in a ring shape and arranged outside the second lens portion.

Fourth Embodiment

Figure 8:
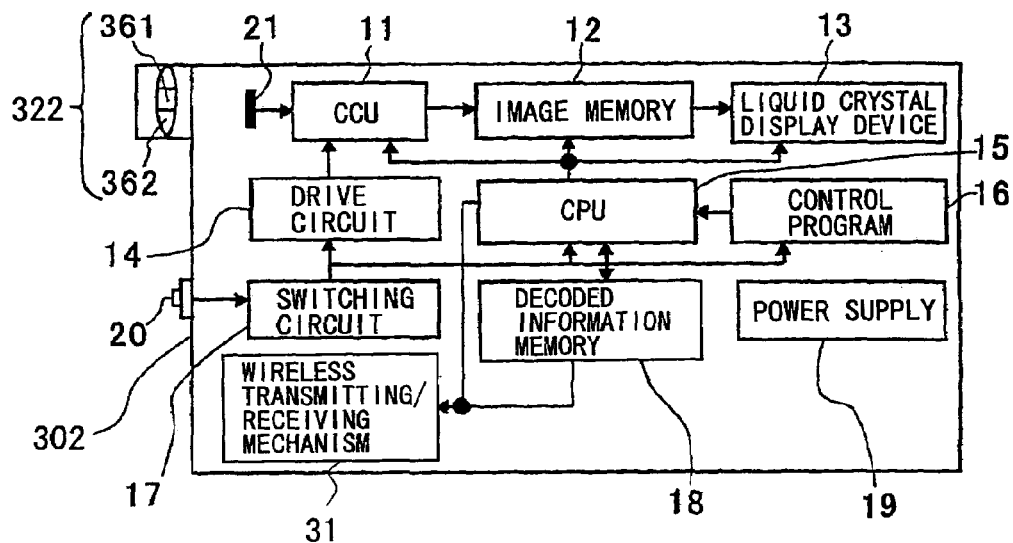
FIG. 8 is an overall structure view showing the imaging apparatus of the fourth embodiment of the present invention.

FIG. 8 is an overall structure view showing the imaging apparatus 302 of the fourth embodiment of the present invention.

In FIG. 8, the imaging apparatus 302 is a mobile telephone (including the PHS) or the like for example. The imaging apparatus 302 has the structure of the imaging apparatus 3 (refer to FIG. 4) of the aforementioned third embodiment, to which a wireless transmitting/receiving mechanism 31 as a communicating means is added. Since the rest of the structure is the same as that of the imaging apparatus 3 of the aforementioned third embodiment, the same reference numerals are designated to the same components to omit explanations in detail, and only the different components will be explained below.

In the fourth embodiment, similarly to the aforementioned third embodiment, information included in an image data (e.g., information included in a two-dimensional bar code) of the second object 82, which is decoded by the decoding means composed of the control program 16 and the CPU 15, is stored in the decoded information memory 18, and this stored information is used for operating the wireless transmitting/receiving mechanism 31 to send and receive information.

Therefore, in this fourth embodiment, the similar effects to those of the third embodiment can be obtained. In addition to the capability of imaging the first and the second objects 81 and 82 readily with high precision, when the second object 82 is a two-dimensional bar code for example, the placement of the wireless transmitting/receiving mechanism 31 and the liquid crystal display device 13 enables to perform various processes based on the information included in the bar code such as, for example, making a telephone call to a telephone number denoted by the two-dimensional bar code by just imaging the two-dimensional bar code, downloading a homepage corresponding to an interment homepage address denoted by the two-dimensional bar code to thereby display the contents of this homepage on the liquid crystal display device 13, and so forth.

Fifth Embodiment

Figure 9:
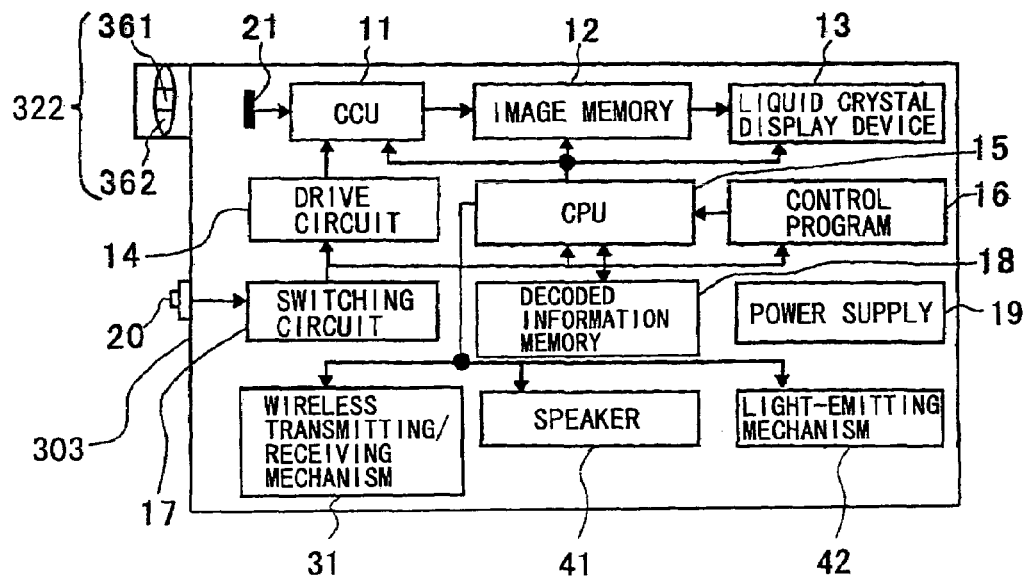
FIG. 9 is an overall structure view showing the imaging apparatus of the fifth embodiment of the present invention.

FIG. 9 is an overall structure view showing the imaging apparatus 303 of the fifth embodiment of the present invention.

In FIG. 9, the imaging apparatus 303 has the structure of the imaging apparatus 302 (refer to FIG. 8) of the aforementioned fourth embodiment, to which a speaker 41 and a light-emitting mechanism 42 are added. Since the rest of the structure is the same as that of the imaging apparatus 302 of the aforementioned fourth embodiment, the same reference numerals are designated to the same components to omit explanations in detail, and only the different components will be explained below.

The speaker 41 as a notifying means is for generating a voice or a confirmation sound after an image data of the second object 82 (e.g., a two-dimensional bar code) is decoded, as a function to notify a completion of the decoding process to the user of the imaging apparatus 303.

The light-emitting mechanism 42 as a notifying means is for emitting a light signal after an image data of the second object 82 (e.g., a two-dimensional bar code) is decoded, as a function to notify a completion of the decoding process to the user of the imaging apparatus 303.

In the fifth embodiment, similarly to the aforementioned fourth embodiment, information included in an image data (e.g., a two-dimensional bar code) of the second object 82 is decoded by the decoding means composed of the control program 16 and CPU 15, and thereafter the completion of the decoding process is notified to the user by at least one of either the speaker 41 or the light emitting mechanism 42. Further, the completion of the decoding process and the decoded result are displayed on the liquid crystal display device 13.

Therefore, in this fifth embodiment, the following effects can be obtained in addition to the similar effects to those of the aforementioned fourth embodiment. The placement of the speaker 41 and the light-emitting mechanism 42 enables to notify a completion of the decoding process to the user, so that the user of the imaging apparatus 303 can confirm a completion of the decoding process. Furthermore, the decoded result can be displayed on the liquid crystal display device 13, so that the user can confirm the validity of sending and receiving information. Accordingly, misoperation by the user can be effectively prevented.

In addition, both the speaker 41 and the light emitting mechanism 42 are included in this fifth embodiment, but either one of them may be omitted.

Sixth Embodiment

Figure 10:
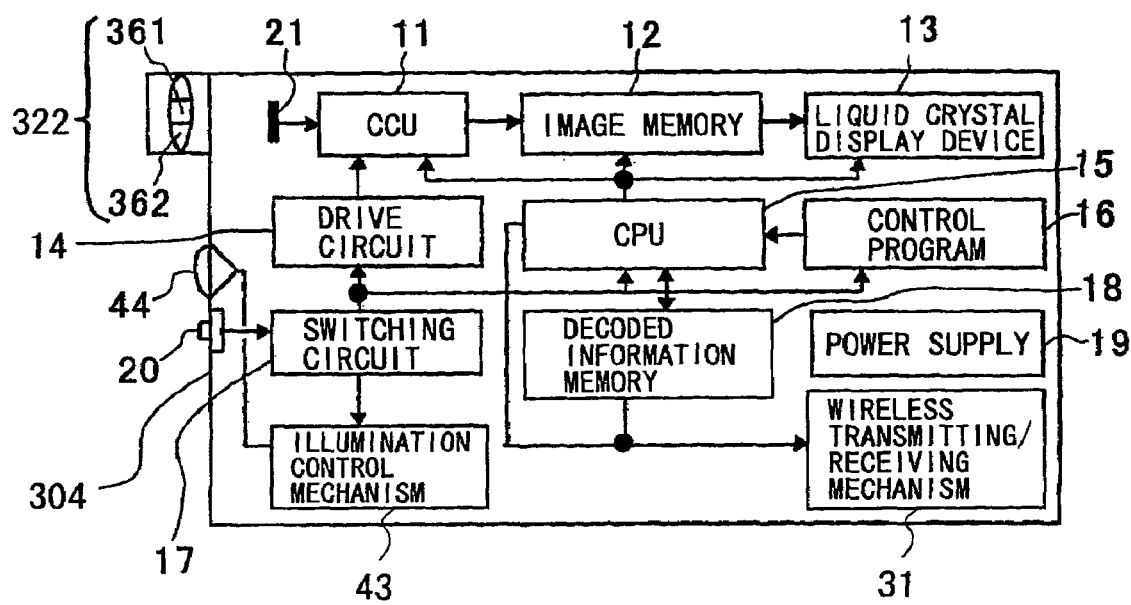
FIG. 10 is an overall structure view showing the imaging apparatus of the sixth embodiment of the present invention.

FIG. 10 is an overall structure view showing the imaging apparatus 304 of the sixth embodiment of the present invention.

In FIG. 10, the imaging apparatus 304 has the structure of the imaging apparatus 302 (refer to FIG. 8) of the aforementioned fourth embodiment, to which an illumination control mechanism 43 and an illumination lamp 44 are added. Since the rest of the structure is the same as that of the imaging apparatus 302 of the aforementioned fourth embodiment, the same reference numerals are designated to the same components to omit explanations in detail, and only the different components will be explained below.

The illumination lamp 44 is for illuminating the second object 82 and is turned on when imaging the second object 82, for example, a bar code arranged at a very close distance (e.g., approximately 30 mm).

The illumination control mechanism 43 is for supplying power to the illumination lamp 44 to turn it on.

According to this sixth embodiment, the following effects can be obtained in addition to the similar effects to those of the aforementioned fourth embodiment. When the imaging apparatus 304 is a portable type, and if this portable type imaging apparatus 304 itself blocks the illumination such as ceiling area lighting, natural light in a room, or the like, a clear image can still be obtained by light of the illumination lamp 44, so that the decoding of information included in the second object 82 (e.g., a two-dimensional bar code) by the control program 16 and the CPU 15 can be easily performed. Especially, when the image signal from the CCU 11 is at a low level due to inadequate illumination, a signal corresponding to this image signal level is sent to the illumination control mechanism 43 in order to increase power supply to the illumination lamp 44, so that the level of the above-mentioned image signal can be increased.

In addition, instead of the illumination lamp 44 and the illumination mechanism 43 of this sixth embodiment, a light-emitting means for producing a flashlight synchronously with the scan timing of the imaging device 21 when imaging the second object 82 can be included to obtain the similar effects.

Seventh Embodiment

Figure 11:
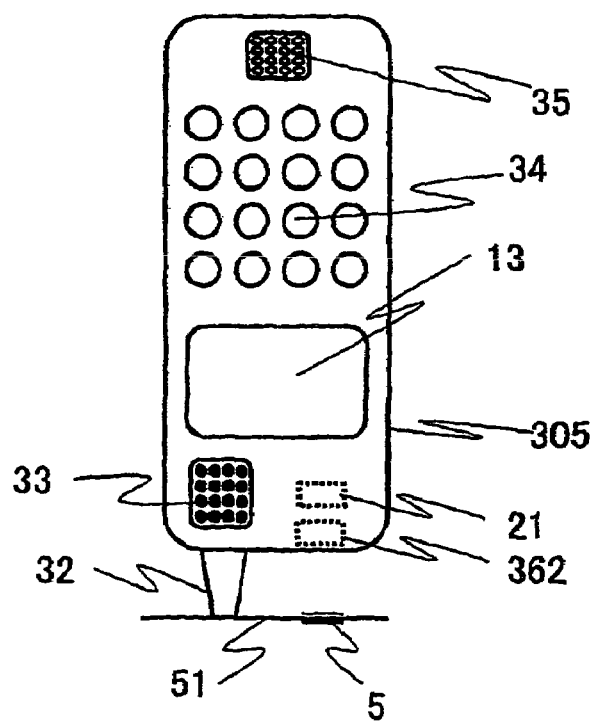
FIG. 11 is an overall structure view showing the imaging apparatus of the seventh embodiment of the present invention.

FIG. 11 is an overall structure view showing the imaging apparatus 305 of the seventh embodiment of the present invention.

In FIG. 11, the imaging apparatus 305 is a mobile telephone (including the PHS), which has an internal structure identical to that of the imaging apparatus 302 (refer to FIG. 8) of the aforementioned fourth embodiment, so that the same reference numerals are designated to the same components to omit explanations in detail, and only the different components will be explained below.

The imaging apparatus 305 includes an antenna 32, a speaker 33, dial buttons 34, and a microphone 35.

Similar to the imaging apparatus 302 of the aforementioned fourth embodiment, the imaging apparatus 305 includes the second lens portion 362 that functions as a close-up attachment lens for imaging a second object 5.

When the antenna 32 is retracted to be in a storage status (the status shown in FIG. 11), a length of the antenna 32 can optimize a distance between a second object 5 arranged on the surface which the top of the antenna 32 comes in contact with and the second lens portion 362.

In the seventh embodiment, the imaging apparatus 305 performs an imaging of the second object 5 as follows.

For example, when imaging the second object 5 that is for close-up imaging (e.g., a two-dimensional bar code) placed on top of a desk 51, the image of the second object 5 is formed in the imaging device 21 by the second lens portion 362. At this time, a distance between the second object 5 and the imaging lens 322 (not shown in FIG. 11) is important, which is needed to be precisely adjusted.

First, as shown in FIG. 11, the imaging apparatus 305 is arranged in such a manner that the top of the antenna 32 is pointing toward the desk 51, and thereafter the imaging apparatus 305 in an upside down posture with the antenna 32 in storage status is moved downward. When the top of the antenna 32 comes in contact with the surface of the desk 51, the imaging apparatus 305 no longer keeps moving downward. In this manner, when the top of the antenna is in contact with the surface of the desk 51, the distance between the second lens portion 362 and the second object 5 is optimized. Subsequently, with the top of the antenna 32 being kept in contact with the surface of the desk 51, the second object 5 is imaged by the second lens portion 362.

According to the seventh embodiment, the following effects can be obtained in addition to the similar effects to those of the aforementioned fourth embodiment. Since the length of the antenna 32 is defined with respect to imaging of the second object 5, the distance between the imaging apparatus 305 and the second object 5 (e.g., a bar code) can be easily optimized in such a manner that the imaging apparatus with the antenna 32 in storage status is moved downward until the top of the antenna 32 comes in contact with the surface on which the second object 5 is arranged (e.g., a surface of the desk 51).

Further, in this seventh embodiment, with a length of the antenna 32 defined as 15 mm, a focal length of the first lens portion 361 (not shown in FIG. 11) of the imaging lens 322 defined as 5 mm, and a focal length of the second lens portion 362 defined as 3.8 mm, an imaging of a two-dimensional bar code as the second object 5 at a distance of 15 mm is tried, and then an excellent image was obtained by the improved decoding precision of the two-dimensional bar code. In addition, when an imaging by the first lens portion 361 was performed, it was able to focus on a person at a distance of approximately 30 cm to 50 cm.

When a close-up imaging by the second lens portion 362 is performed, the imaging apparatus 305 is positioned to be upside down. However, regarding an image display on the liquid crystal display device 13, an image of a close-up imaging in progress and an image of a decoding result can be easily readable by reversing vertical and horizontal scanning directions.

Furthermore, in this seventh embodiment, the adopted imaging lens 322 is a multifocal lens composed of the second lens portion 362 in a ring shape and the first lens portion in a circular shape formed in one piece, so that the imaging apparatus 305 can be miniaturized in size and simplified in handling and operation.

In addition, an imaging lens identical to the imaging lens 22 composed of the first lens portion 61 and the second lens portion 62 of the imaging apparatus 1 of the aforementioned first embodiment (refer to FIG. 1) may also be adopted as the imaging lens.

Eighth Embodiment

Figure 12:
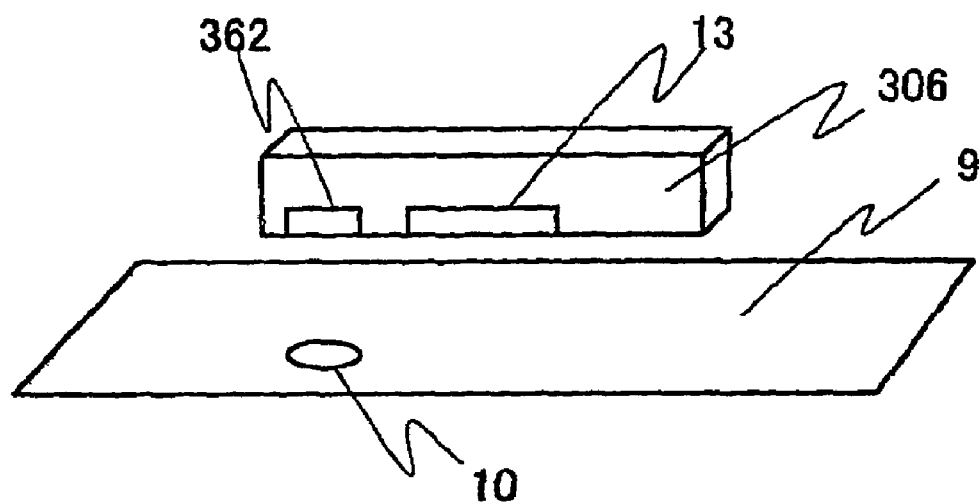
FIG. 12 is an explanatory view showing a usage of the imaging apparatus of the eighth embodiment of the present invention.

FIG. 12 is an explanatory view showing a usage of the imaging apparatus 306 of the eighth embodiment of the present invention.

The imaging apparatus 306 is a portable type of the imaging apparatus including a wireless transmitting/receiving mechanism for example, which has an internal structure identical to that of the imaging apparatus 302 (refer to FIG. 8) of the aforementioned fourth embodiment, so that the same reference numerals are designated to the same components to omit explanations in detail.

In FIG. 12, similar to the imaging apparatus 302 of the aforementioned fourth embodiment, the imaging apparatus 306 includes the imaging lens composed of the first lens portion 361 having a front shape in circular shape (not shown in FIG. 12) and the second lens portion 362 having a front shape in ring shape formed in one piece, and the liquid crystal display device 13 as a displaying means. In addition, an illuminating means not shown in the view is attached to the liquid crystal display device 13.

In the eighth embodiment, the imaging apparatus 306 performs an imaging of a bar code 10 as a second object as follows. As shown in FIG. 12, the bar code 10 as the second object is printed on a recording paper 9, and this bar code 10 is read by the second lens portion 362. At this time, the reading of the bar code 10 is performed while it is illuminated by the illuminating means attached to the liquid display device 13. Thereafter, when decoding of the information included in the bar code 10 is completed, the completion of decoding is notified by a buzzer or by light, and if necessary, a decoding result is displayed on the liquid crystal display device 13.

Furthermore, since the bar code 10 includes information such as a telephone number, e-mail address, URL address, or the like, various processes are performed such as a telephone call or displaying a homepage based on a obtained decoding result such as a telephone number, address, or the like, for example, as disclosed in the Japanese Patent Application Laid-open No. H8-69436 and No. H10-254802.

Therefore, according to the eighth embodiment, in addition to the similar effects to those of the aforementioned fourth embodiment, a clear image can be obtained to improve the decoding precision by reading the bar code 10 while it is illuminated by the illuminating means attached to the liquid display device 13.

Ninth Embodiment

Figure 13:
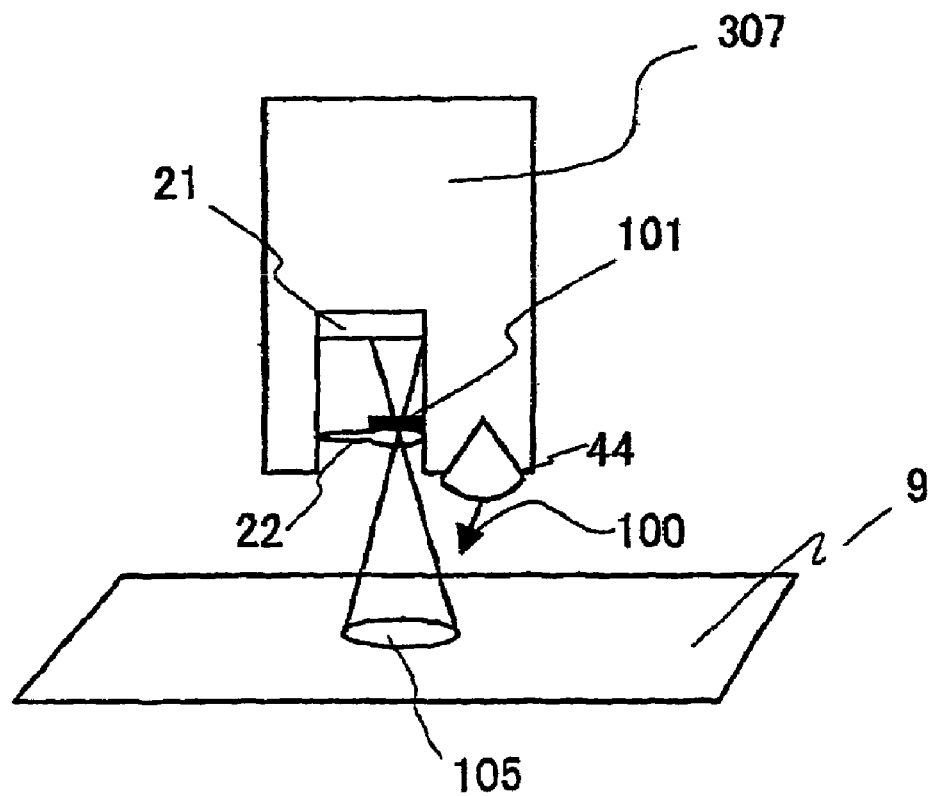
FIG. 13 is an explanatory view showing a usage of the imaging apparatus of the ninth embodiment of the present invention.

FIG. 13 is an explanatory view showing a usage of the imaging apparatus 307 of the ninth embodiment of the present invention. This ninth embodiment is an example of reading a bar code 105 as a second object when it is printed in invisible ink that emits fluorescent light of a specific color upon irradiation of excitation light 100. The bar code 105 is printed in invisible ink that cannot be recognized by the unaided eye, which emits light with a longer wavelength than that of the excitation light 100 that is used for irradiation.

Since the imaging apparatus 307 has a structure substantially identical to that of the imaging apparatus 304 of the aforementioned sixth embodiment (refer to FIG. 10), the same reference numerals are designated to the same components to omit explanations in detail, and only the different components will be explained below.

In this ninth embodiment, a light filter 101 is arranged between the bar code 105 and the imaging device 21. This light filter 101 lets through light with a wavelength of invisible ink emitted upon irradiation of the excitation light 100 to the bar code 105 using the illumination lamp 44 and blocks light with other wavelength.

In addition, in this ninth embodiment, instead of the imaging lens 322 of the imaging apparatus 304 of the aforementioned sixth embodiment (refer to FIG. 10), an imaging lens identical to the imaging lens 22 of the imaging apparatus 1 of the aforementioned first embodiment (refer to FIG. 1) is used.

Therefore, according to the ninth embodiment, in addition to the similar effects to those of the aforementioned sixth embodiment, the contrast can be improved since the light filter 101 is included, so that the image from the invisible ink can be clearly imaged.

Generally, on the recording paper 9 on which the bar code 105 is recorded, it is quite common to have not only the bar code 105 printed in invisible ink but also things printed in printing ink that is visible to the unaided eye other than the bar code 105. Accordingly, it is necessary to selectively recognize only the light emitted from invisible ink for decoding information included in the bar code 105 printed in invisible ink. In this ninth embodiment, since the light filter 101 is adopted, the light emitted from invisible ink is selectively directed to the imaging device 22, and light reflected from other printing ink is blocked, so that a clear image of the bar code 105 can be obtained. In addition, an excellent result can be obtained when an ultraviolet ray is used as the excitation light 100.

In a case that lighting is provided only by the excitation light 100 with no other illumination light than the excitation light 100, only a part printed in invisible ink emits light, and therefore it is not necessary to use the light filter 101.

In addition, in this ninth embodiment, the light filter 101 is arranged between the imaging lens 22 and the imaging device 21, but the light filter 101 may also be arranged between the bar code 105 and the imaging lens 22.

Furthermore, in this ninth embodiment, the imaging lens identical to the imaging lens 22 of the imaging apparatus 1 of the aforementioned first embodiment 1 (refer to FIG. 1) is adopted, but an imaging lens identical to the imaging lens 322 of the imaging apparatus 304 of the aforementioned sixth embodiment (refer to FIG. 10) may also be adopted.

Tenth Embodiment

Figure 14:
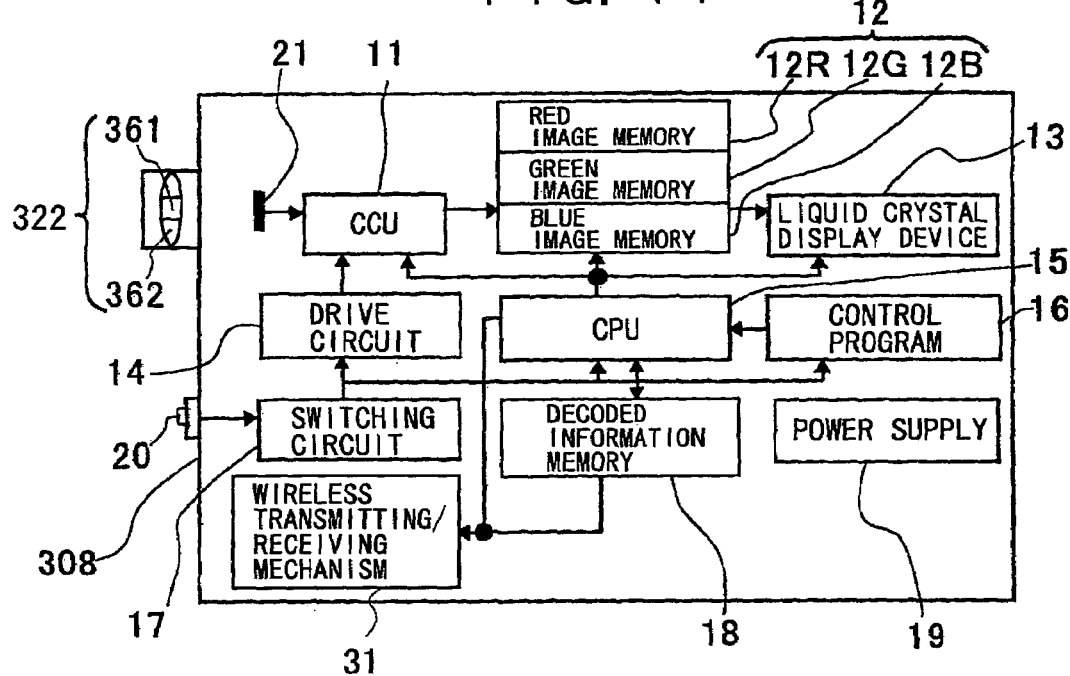
FIG. 14 is an overall structure view showing the imaging apparatus of the tenth embodiment of the present invention.

FIG. 14 is an overall structure view showing the imaging apparatus 308 of the tenth embodiment of the present invention.

In FIG. 14, the imaging apparatus 308 has a structure substantially identical to that of the imaging apparatus 302 (refer to FIG. 8) of the aforementioned fourth embodiment except the differences in composition of the image memory 12 and the processing method of an image data, so that the same reference numerals are designated to the same components to omit explanations in detail, and only the different components will be explained below.

The image memory 12 is respectively divided for three colors of an image signal into a red image memory 12R, a green image memory 12G, and a blue image memory 12B.

Further, there are composed of a compensating means by the control program 16 and the CPU 15 for compensating a signal stored in the red image memory 12R according to a signal stored in the green image memory 12G or the blue image memory 12B.

In the tenth embodiment, the imaging apparatus 308 performs an imaging of a bar code 105 (refer to FIG. 13) as a second object as follows. At this time, as shown in the aforementioned ninth embodiment, on the recording paper 9 as the second object, it is quite common to have not only the bar code 105 printed in invisible ink but also objects printed in printing ink that is visible to the unaided eye other than the bar code 105. Accordingly, it is necessary to selectively recognize only the light emitted from invisible ink for decoding information included in the bar code 105 printed in invisible ink.

When the bar code 105 printed in invisible ink is exposed to an ultraviolet ray, it emits light with a long wavelength that increases the red signal. However, as described above, the signal stored in the red image memory 12R includes not only the signal of the bar code 105 but also signals of other objects printed in normal ink on the recording paper 9. For that reason, the compensating means adjusts an amplitude of a signal in the green image memory 12G or the blue image memory 12B, both of which do not receive signals from invisible ink, and then subtracts the adjusted signal from the signal in the red image memory 12R to thereby produce a clear image of the bar code 105 emitted from the invisible ink.

According to the tenth embodiment, in addition to the similar effects to those of the aforementioned fourth embodiment, a clear image of the bar code 105 emitted from the invisible ink can be produced in order to precisely read the information included in the bar code 105 in such a manner that the compensating means adjusts an amplitude of a signal in the green image memory 12G or the blue image memory 12B and then subtracts the adjusted signal from the signal in the red image memory 12R.

Eleventh Embodiment

Figure 15:
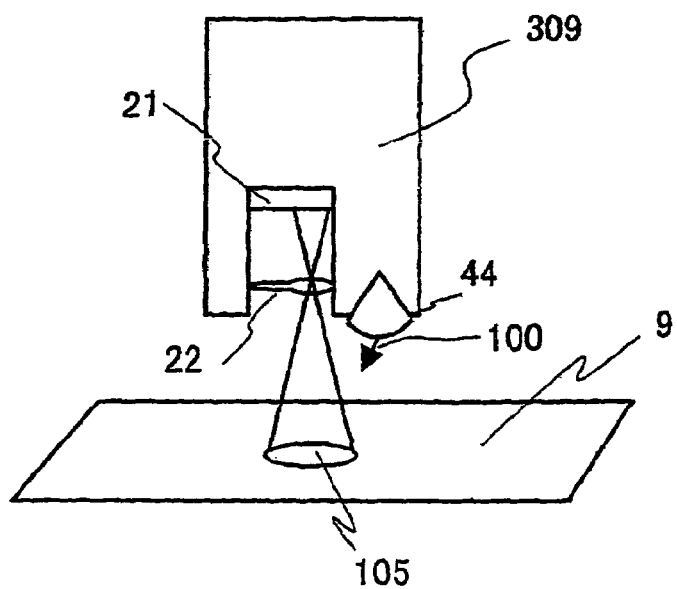
FIG. 15 is an explanatory view showing a usage of the imaging apparatus of the eleventh embodiment of the present invention.
Figure 16:
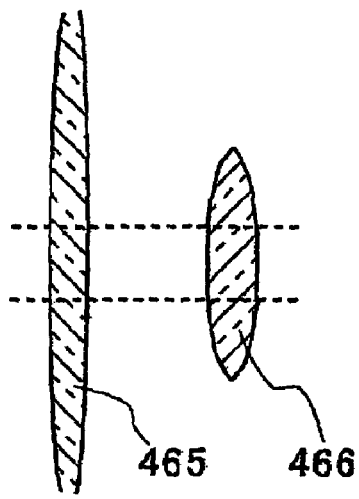
FIG. 16 is a view showing a manufacturing method of the multifocal imaging lens provided in the imaging apparatus of the present invention.
Figure 17:
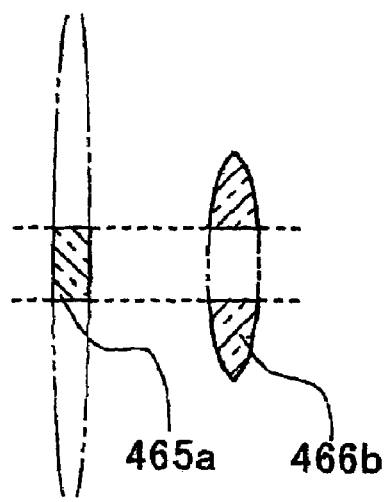
FIG. 17 is another view showing the manufacturing method of the multifocal imaging lens provided in the imaging apparatus of the present invention.
Figure 18:
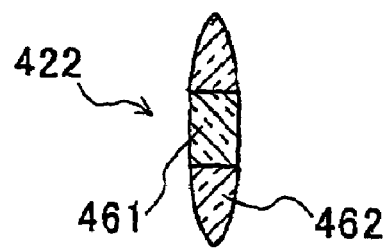
FIG. 18 is still another view showing the manufacturing method of the multifocal imaging lens provided in the imaging apparatus of the present invention.

FIG. 15 is an explanatory view showing a usage of the imaging apparatus 309 of the eleventh embodiment of the present invention.

The imaging apparatus 309 has a structure substantially identical to that of the imaging apparatus 304 of the aforementioned sixth embodiment (refer to FIG. 10) except the differences in composition of the image memory 12, processing method of an image data, and composition of image lens, so that the same reference numerals are designated to the same components to omit explanations in detail, and only the different components will be explained below.

The image memory 12 is divided into an irradiated image memory for storing an image signal A generated when invisible ink emits light upon irradiation of excitation light 100, a pre-irradiation image memory for storing an image signal B of the imaging device 21 before performing irradiation of the excitation light 100, and a compensated image memory for storing a signal A-B that is generated by subtracting the image signal B from the image signal A.

Further, there are composed of a difference operation processing means by the control program 16 and the CPU 15 for generating an image of the bar code 105 as the second object based on the difference between an image signal obtained by imaging the bar code 105 as the second object with irradiation of the excitation light 100 thereon and an image signal obtained by imaging without irradiation of the excitation light 100.

Further, in this eleventh embodiment, instead of the imaging lens 322 (refer to FIG. 10) of the imaging apparatus 304 of the aforementioned sixth embodiment, an imaging lens identical to the imaging lens 22 of the imaging apparatus 1 of the aforementioned first embodiment (refer to FIG. 1) is adopted.

In the eleventh embodiment, the imaging apparatus 309 performs an imaging of the bar code 105 as follows. As shown in FIG. 15, when imaging the bar code 105 on a recording paper 9, the image signal B in the imaging device 21 before performing the irradiation of the excitation light 100 is stored in the pre-irradiation image memory, and then the image signal A generated when invisible ink emits light upon irradiation of the excitation light 100 is stored in the irradiated image memory. Subsequently, the difference operation processing means generates an image signal of the bar code 105 from the difference A-B between the signal A and the signal B and then stores the operation result in the compensation image memory.

At this time, the image signal A which is generated when invisible ink emits light upon irradiation of the excitation light 100 includes not only the signal from the bar code 105 but also signals of other objects printed in normal ink on the recording paper 9. However, the image signal B of the imaging device 21 before performing the irradiation of the excitation light 100 includes only the signals of objects printed in normal ink on the recording paper 9, and not the signal from the invisible ink. Therefore, a subtraction of the image signal B from the image signal A provides a clear image of the bar code 105 generated by the light emission of the invisible ink.

According to the eleventh embodiment, the following effects can be obtained in addition to the similar effects to those of the aforementioned sixth embodiment. The difference operation processing means provides an image signal of the bar code 105 by subtracting the image signal B before performing the irradiation of the excitation light 100 from the image signal A generated by light emission of the invisible ink, so that a clear image of the bar code 105 generated by light emission of the invisible ink can be obtained, and therefore information included in the bar code 105 can be appropriately read.

In addition, in this eleventh embodiment, the imaging lens identical to the imaging lens 22 of the imaging apparatus 1 of the aforementioned first embodiment (refer to FIG. 1) is used, but an imaging lens identical to the imaging lens 322 of the imaging apparatus 304 of the aforementioned sixth embodiment (refer to FIG. 10) may also be used.

INDUSTRIAL AVAILABILITY

As previously described, the imaging apparatus according to the present invention is advantageous for various imaging apparatuses having an image input function such as a personal digital assistant (PDA), a mobile telephone (including the Personal Handy-phone System (PHS)), a remote controller for consumer electronics such as a television or a videocassette recorder, a personal computer equipped with a camera, a monitoring camera and so forth. The present invention is especially suitable when imaging a first object at a regular distance and a second object nearer than the first object and performing various processes such as communication, display, and so forth based on the information obtained by imaging the second object.

The invention claimed is:

1. An imaging apparatus having an imaging lens, an imaging device for capturing an image formed by the imaging lens, and a camera control unit, wherein said imaging lens is a multifocal lens composed of a first lens portion having a first focal length for imaging a first object at a normal distance and a second lens portion having a second focal length for imaging a second object nearer than the first object, and the first lens portion and the second lens portion are arranged on the same plane and formed in one piece;
   said multifocal lens is arranged in such a manner that the optical axis of said first lens portion coincides with the optical axis of said second lens portion, and at the same time, light passing through said first lens portion is incident on the whole plane of said imaging device, and light passing through said second lens portion is also incident on the whole plane of said imaging device; and
   said camera control unit performs a process to obtain an image of said first object by compensating for a contrast lowered by the light passing through said second lens portion being incident on said imaging device as light not forming in image when said first object is imaged, and performs a process to obtain an image of said second object by compensating for a contrast lowered by the light passing through said first lens portion being incident on said imaging device as light not forming in image when said second object is imaged.

2. The imaging apparatus according to claim 1, wherein the same plane is orthogonal to an optical axis of said imaging lens.

3. The imaging apparatus according to claim 1, wherein a front shape of the first lens portion is one of a circular shape, an oval shape, or a polygonal shape, a front shape of the second lens portion is a ring shape, and the second lens portion is arranged outside the first lens portion concentric with the first lens portion.

4. The imaging apparatus according to claim 1, wherein a front shape of the first lens portion is a ring shape, a front shape of the second lens portion is one of a circular shape, an oval shape, or a polygonal shape, and the first lens portion is arranged outside the second lens portion concentric with the second lens portion.

5. The imaging apparatus according to claim 1, wherein a front shape of the first lens portion is one of a portion of a circular shape, a portion of an oval shape, or a portion of a polygonal shape, and a front shape of the second lens portion is different from the front shape of the first lens portion and is one of the portion of the circular shape, the portion of the oval shape, or the portion of the polygonal shape, and a linear portion formed on an outline of the first lens portion is arranged in direct contact with a linear portion formed on an outline of the second lens portion.

6. The imaging apparatus according to claim 5, wherein both front shapes of said first lens portion and said second lens portion have semi-circular shapes, and the linear portions of these semi-circular shapes are arranged in direct contact with each other.

7. The imaging apparatus according to claim 1, further comprising an image memory, wherein a first image obtained by imaging the first object is stored in said image memory as a moving image or a still image, and a second image obtained by imaging the second object is stored in said image memory as a moving image or a still image.

8. The imaging apparatus according to claim 1, further comprising a decoding means for decoding a digital code or a character that is the second object, and a communicating means for performing communications based on information included in a digital code or a character decoded by said decoding means, wherein said camera control unit performs a process to obtain an image of said second object by compensating for contrast as a binary signal, the contrast being lowered by a light passed through said first lens portion being incident on said imaging device as a light not forming in image when said second object is imaged.

9. The imaging apparatus according to claim 1, further comprising a light-emitting means for emitting a flashlight synchronously with scan timing of said imaging device when imaging the second object.

10. The imaging apparatus according to claim 1, further comprising a color filter arranged on at least one side of a front or back face of said imaging lens, said color filter being used when imaging the second object.

11. The imaging apparatus according to claim 1, further comprising an image memory plurally divided for each color, and a compensation means for compensating a signal stored in one of divided image memories for respective colors according to a signal stored in one of the other divided image memories for respective colors.

12. The imaging apparatus according to claim 1, further comprising a difference operation processing means for producing an image of the second object based on a difference between an image signal obtained by imaging with irradiation of excitation light on the second object and an image signal obtained by imaging without irradiation of excitation light.

13. The imaging apparatus according to claim 1, further comprising a display means for displaying information on a screen and an illumination means attached to said display means for illuminating the second object by light emission from the screen of said display means when imaging the second object.

14. The imaging apparatus according to claim 1, further comprising an antenna for wireless transmitting and receiving, said antenna in storage status having a length that optimizes a distance between the second object arranged on a surface to which the top of said antenna comes in contact with and the second lens portion.

15. The imaging apparatus according to claim 1, wherein said imaging apparatus is mounted on any of a personal digital assistant (PDA) or a mobile telephone including the personal handy-phone system (PHS).

16. An imaging apparatus having an imaging lens, an imaging device for capturing an image formed by the imaging lens, and an antenna for wireless transmitting and receiving, wherein said imaging lens is a multifocal lens composed of a first lens portion having a first focal length for imaging a first object at a normal distance and a second lens portion having a second focal length for imaging a second object nearer than the first object, and the first lens portion and the second lens portion are arranged on the same plane and formed in one piece, and said antenna in storage status having a length that optimizes a distance between the second object arranged on a surface to which the top of said antenna comes in contact with and the second lens portion.

* * * * *